Oct. 10, 1939.  P. L. JONES  2,175,468
SILO
Filed May 20, 1938  2 Sheets-Sheet 1
Fig. 1.
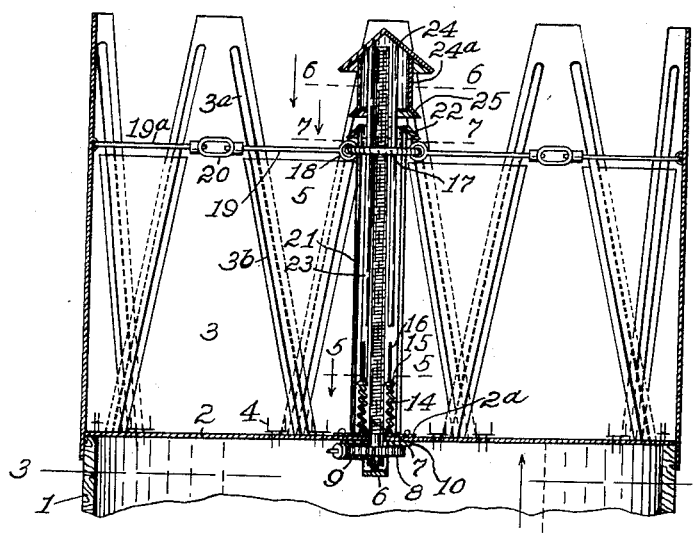
Fig. 5.
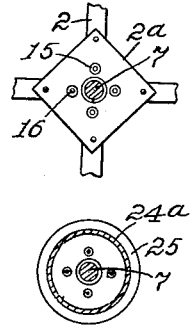
Fig. 6.
Fig. 3.
Fig. 7.
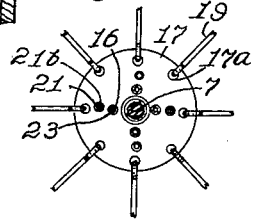
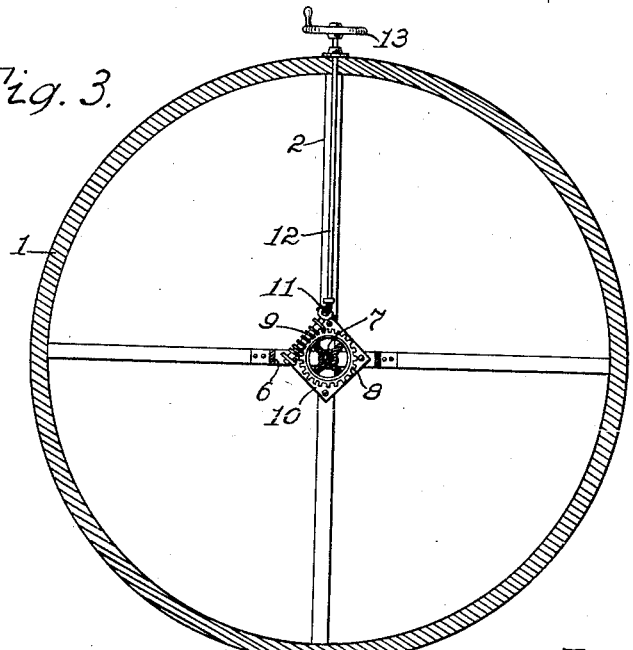
Inventor
Paul L. Jones,
By
G. C. Kennedy,
Attorney Oct. 10, 1939.   P. L. JONES   2,175,468
SILO
Filed May 20, 1938   2 Sheets-Sheet 2

Inventor
Paul L. Jones,
G. C. Kennedy
Attorney

Patented Oct. 10, 1939

2,175,468

UNITED STATES PATENT OFFICE 2,175,468

SILO

Paul L. Jones, Cedar Falls, Iowa

Application May 20, 1938, Serial No. 208,961

3 Claims. (Cl. 20—1.41)

My invention pertains to improvements in silos, and particularly to sectional covers therefor mounted for simultaneous opening and closing.

An object of my improvements is to supply self-locking means movably connected between the silo body and the cover sections, and operable to either open the sections to an erect position simultaneously, or to return them also simultaneously to closed positions.

Another object of my invention is to provide a top finial closure and locking member for the free terminations of the sections when closed, and adapted to at times being moved to a raised position before the sections are elevated by said self-locking and actuating means, and to be returned and lowered to clamp said terminations when the sections are swung to closed positions.

Another object of my improvements is to furnish filler plates for the gaps between the raised sections, with means for releasably securing them thereto, to thus temporarily extend the silo upwardly and permitting the silo to be filled with ensilage above the silo walls to a desired height before the settling and to thus fill the silo after such settling.

Other improvements will be adverted to hereinafter.

My said improvements are described in the following specification, protected by the accompanying claims, and illustrated by the appended drawings, and it is to be understood that various modifications may be effected therein without departing from my invention.

Figure 2:
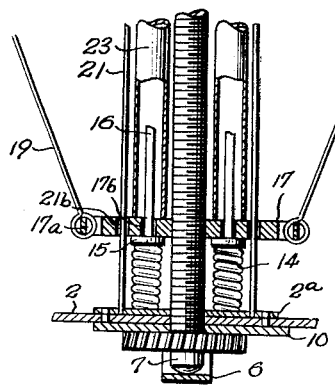

Figs. 1 and 2 are like vertical central sections of the upper part of an open top silo with the lower part broken away, showing respectively the roof sections elevated by my self-locking coacting devices, and lowered to closed positions by the same means, also showing the filler plates for the intervals between the sections in place between and removably mounted thereon. Fig. 3 is a horizontal cross section of the silo top, as seen from below as taken on the broken line 3—3 of Fig. 1, and displaying the self-locking worm-gear and the means connected thereto for manually actuating said gear in either of opposite directions.

Figure 10:
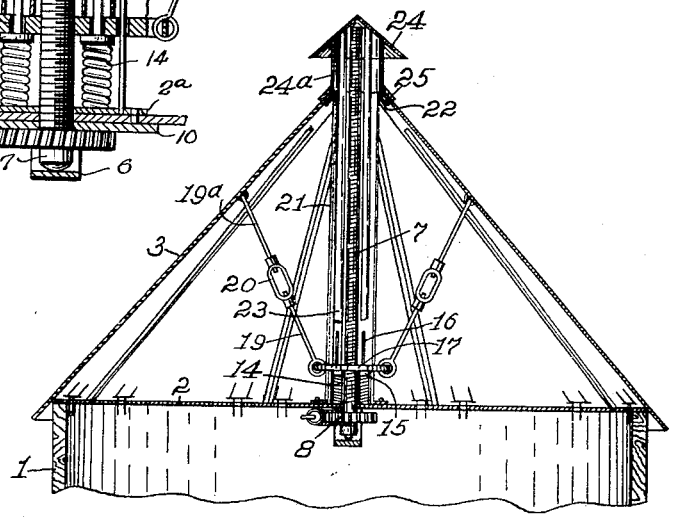
Figure 8:
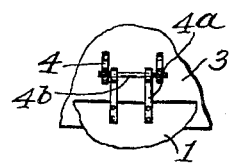
Figure 4:
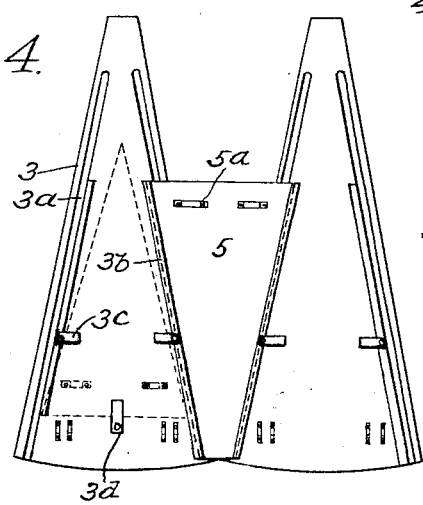
Figure 9:
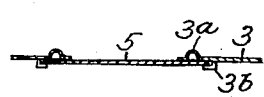

I have shown also herein detail figures of various elements of my invention, Fig. 4 being an elevation of the inner faces of two of the said sections in association with an intervening filler plate mounted removably in slideways thereon, with the means for removably securing the filler plates in reversed positions on the inner faces of the sections when removed therefrom, as shown by a representation of a filler plate in dotted lines and reversed upon one of the sections. Fig. 5 is an enlarged cross section of the lower parts of the central elevating means for the sections taken on the dotted line 5—5 of Fig. 1. Fig. 6 is a like cross section of Fig. 1 on the dotted line 6—6 thereof, and Fig. 7 is a like cross section of Fig. 1 taken on the dotted line 7—7 thereof. Fig. 8 is an enlarged detail view of the inner face of one of the section hinges as connecting a lower end of a section to the upper inner wall of the silo. Fig. 9 is a cross section of adjacent portions of a pair of sections, and of one of the filler plates as associated therewith in operative position. Fig. 10 is an enlarged detail elevation of the coacting means for operating the swinging sections of the silo roofing.

The numeral 1 denotes the upper end part of an open top silo. Cross-bars 2 are secured at their extremities to the top of the silo, at right angles to each other and connected at their crossing parts by a plate 10. Another plate 2a is mounted on and secured to said cross bars above, and the two plates and cross-bars are apertured in alinement to be traversed by the lower unthreaded end of a vertical central threaded shaft 7, whose lower end is mounted rotatably and supported upon a bracket member 6 thereunder, whose terminations are fastened to the cross-bars. A worm-wheel 8 is secured on said shaft between the lower plate 10 and the bracket 6, and is in mesh with a worm-shaft 9 mounted on a raised bearing member on one of the cross-bars 2. A rotatable shaft 12 below another cross-bar 2 has its inner end connected to the adjacent end of the worm-shaft by a universal joint 11, and the outer part of the shaft 12 traverses an aperture in the silo 1 and has without a crank device 13, by which the shaft 12 may be rotated in either of opposite directions, the worm-gearing being self-locking.

Triangular roof sections 3, with truncated upper free ends, are hinged around the silo rim and mounted on hinge parts 4, 4a and 4b as best shown in Fig. 8, to stand erect when opened, and to overlap at their adjacent edges when lowered as shown in Fig. 2. Each section 3 is preferably strengthened by pressed out ridges 3a at or near their side edges as shown in Fig. 4.

A relatively large circular nut 17 (see Fig. 7) is on and in mesh with the screw-shaft 7 above the upper plate 2a, and linking connections 19 and 19a are end connected hingedly at opposite ends to and between said nut 17 and each of the sections 3, the connections being sectional and with the sections connected by turn-buckles 20 for adjustments, the inner ends of the inner connections 19 being ringed into holes 17a in the nut 17. A plurality of upright rods 21 are fixed at their lower ends upon the plate 2a equidistant from the shaft 7 therearound and an open conical rim plate 22 is fixed on their upper ends around said shaft 7. Coiled compression springs 14 are mounted at their lower ends upon the plate 2a and circular blocks 15 are mounted on the upper ends of the springs below the nut 17 and the blocks 15 have central upwardly directed pins 16 fixed thereon and loosely traversing holes 17b in said nut to extend a short distance thereabove. The fixed rods 21 also traverse holes 21b in the nut 17.

The numeral 24 denotes a hollow conical cap positioned centrally above the upper end of the shaft 7 and the conical rim plate 22 and has a depending part 24a ending below in a conical rim plate or flange 25 above the rim plate 22 and of shape and dimensions to fit the rim plate 22. The cap 24 has a plurality of fixed depending tubes 23 open at their lower ends, and shown as broken away in Fig. 1 a short distance above their lower ends, and the pins 16 extend into the lower parts of the tubes 23 loosely.

Referring to Fig. 4, 5 is a triangular flat plate truncated at its apex, and having on one face a pair of handles 5a for convenience in handling them. The sections 3 have at or near their side edges pressed out longitudinal hollows 3a as strengthened means. Also, the plates 3 have a plurality of rockable clip arms as at 3c and 3d to hold different edges of the plate 5 when unshipped. The sections 3 also have on their inner faces convergent angle-flanges to seat the plates 5 removably slidably therein when the sections are upright.

*Operation.*—Referring to Figs. 1, 2 and 10, to spread the sections 3 outwardly to vertical positions shown in Fig. 1 where their lower ends overlap the outer face of the silo 1 preventing farther outward swinging, the operator without the silo by means of the crank-handle 13 rotates the shaft 12, which by its universal joint 11 also rotates the worm-shaft 9 and intermeshing worm-wheel 8 with the shaft 7 in one direction. Referring to Fig. 2 which discloses the sections and coacting other elements in closed condition, the springs 14 are compressed between the nut 17 and the plate 2a, the nut bearing against the blocks 15. As the worm-gearing operates, the rotating shaft 7 propels the nut 17 upwardly therealong to a position shown in Fig. 1, where the connecting arms 19—19a between the nut and sections are horizontal and the sections vertical. As the nut moves upwardly and has traveled a short distance, the springs 14 are released from compression and become extended as shown in Fig. 1, their erect pins 16 moving upwardly in the open depending end parts of the tubes 23 as guides, and the springs and blocks 15 thereon force upwardly the tubes 23 together with the conical cap 24. The cap 24 then becomes stationary due to the relaxation of the springs 14, and at a sufficient height as to afford clearance for the truncated free ends of the sections 3 to swing outwardly when the nut has traveled a sufficient distance upwardly on the shaft 7. The operator then may fit the triangular filler plates 5 on the inner faces of the sections 3 in the seating flanges 3b, thus extending the effective height of the silo so that it may be filled to the upper edges of the plates 5, to gradually subside in wilting or drying to the upper level of the silo proper, thus utilizing the filling capacity of the silo to the utmost. The worm-gearing then may be rotated oppositely, the nut descending to compress the springs 14, the links 19—19a swinging the sections to closed position before the cap 24 descends with the descending tubes 23. The conic flanged element 22 seats the ends of the sections, while the cap flange 25 clamps the section ends against the element 22, completely closing the silo top.

I claim:

1. The combination with an open top silo, of a plurality of triangular roof sections hinged thereto to swing from an upright position respectively together to a closed position, worm-gearing mounted centrally within the silo and operable from without, a threaded central vertical shaft supported within the silo and adapted to be rotated by said gearing in either of opposite directions, a nut mounted on and in mesh with said shaft, linking connections between said nut and said sections, and a closure cap above the shaft and resiliently supported on the silo above said nut and sections for limited vertical movements, whereby when the worm-gearing rotates the shaft in one direction to shift the nut upwardly to shift said linking-connections and sections to raised positions, the resilient supports for the cap shift the cap upwardly to release the sections before the nut connections lift the sections to upright positions together.

2. The combination with an open top silo, of inner and outer overlapping concentric triangular roof sections hinged around its top rim to swing from a raised to a lowered position or reversely, self-locking worm-gearing within the silo, operable from without, connected movably to the sections to move them to opened position or to return them to closed positions, inverted triangular filler plates for the intervals between the sections, the sections having lateral longitudinal inwardly opening flanges thereon to receive and releasably hold the filler plates when the sections are in a raised position, and the sections having on their inner faces hinged clips to releasably hold the filler plates when demounted, reversed, and seated therein.

3. The combination with an open top silo, concentric pluralities of truncated triangular roof sections hinged around its top rim to swing from a raised to a lowered position or reversely, self-locking actuating worm-gearing within the silo, a shaft extending outwardly from the gearing from without, to either move the sections together to a raised or a lowered position, a terminal closure device positioned above the center of the silo and supported on the silo for limited vertical movements to and fro, a perforated nut on and actuated by said self-locking means, connections hinged between the nut and the sections actuated by said self-locking actuating means to lift or lower said closure device when the sections are to be raised or lowered, resilient devices positioned beneath said nut, blocks supported on said resilient devices having pins extending upwardly through certain perforations of the nut, said terminal device having depending tubes loosely seating said pins, an annulus rigidly supported beneath and as a stop for the ends of roof sections when lowered, said terminal closure when lowered resting upon said ends of the roof sections lockably, and said terminal closure device when lifted permitting the sections to be lowered terminally thereunder, and when the sections are lowered the closure device being lowered to engage and seal the truncated ends of the sections.

PAUL L. JONES.